(12) United States Patent
Vyroubal (10) Patent No.: US 8,199,460 B2
(45) Date of Patent: Jun. 12, 2012

(54) SOLID ELECTROLYTIC CAPACITOR WITH IMPROVED ANODE TERMINATION

(75) Inventor: Ales Vyroubal, Postrelmov (CZ)

(73) Assignee: AVX Corporation, Fountain Inn, SC (US)

( * ) Notice: Subject to any disclaimer, the term of this patent is extended or adjusted under 35 U.S.C. 154(b) by 114 days.

(21) Appl. No.: 12/890,908

(22) Filed: Sep. 27, 2010

(65) Prior Publication Data
US 2012/0075775 A1 Mar. 29, 2012

(51) Int. Cl.
*H01G 9/00* (2006.01)
(52) U.S. Cl. ........ 361/523; 361/525; 361/528; 361/529; 361/540; 361/541; 29/25.01; 29/25.03
(58) Field of Classification Search .......... 361/523, 361/516, 517–519, 525, 528–529, 530–531, 361/540–541, 503–504, 512; 29/25.01, 25.03
See application file for complete search history.

(56) References Cited

U.S. PATENT DOCUMENTS

| | | |
|---|---|---|
| 3,345,545 A | 10/1967 | Bourgault et al. |
| 4,085,435 A | 4/1978 | Galvagni |
| 4,945,452 A | 7/1990 | Sturmer et al. |
| 5,198,968 A | 3/1993 | Galvagni |
| 5,357,399 A | 10/1994 | Salisbury |
| 5,394,295 A | 2/1995 | Galvagni et al. |
| 5,457,862 A | 10/1995 | Sakata et al. |
| 5,473,503 A | 12/1995 | Sakata et al. |
| 5,495,386 A | 2/1996 | Kulkarni |
| 5,729,428 A | 3/1998 | Sakata et al. |
| 5,812,367 A | 9/1998 | Kudoh et al. |
| 5,949,639 A | 9/1999 | Maeda et al. |
| 6,191,936 B1 | 2/2001 | Webber et al. |
| 6,197,252 B1 | 3/2001 | Bishop et al. |
| 6,236,561 B1 | 5/2001 | Ogino et al. |
| 6,322,912 B1 | 11/2001 | Fife |
| 6,391,275 B1 | 5/2002 | Fife |
| 6,416,730 B1 | 7/2002 | Fife |

(Continued)

FOREIGN PATENT DOCUMENTS

GB 2 436 211 A 9/2007

(Continued)

OTHER PUBLICATIONS

Search Report for GB1110055.9 dated Oct. 13, 2011, 3 pages.

*Primary Examiner* — Nguyen T Ha
(74) *Attorney, Agent, or Firm* — Dority & Manning, P.A.

(57) ABSTRACT

A capacitor containing a solid electrolytic capacitor element that includes an anode, dielectric, and solid electrolyte is provided. An anode lead extends from the anode and is electrically connected to an anode termination. The anode termination contains an upstanding portion that is bent or folded about an axis so that it possesses two or more sections. A slot (e.g., U-shaped) extends through the sections of the upstanding portion for receiving an anode lead. The resulting "folded" configuration of the anode termination increases the total thickness of the upstanding portion and its associated slot, which thereby enhances the degree of mechanical support and stability that the termination provides to the anode lead. This is particularly beneficial for thicker anode leads, such as those having a height and/or width of about 100 micrometers or more, in some embodiments about 200 micrometers or more, and in some embodiments, from about 250 to about 1000 micrometers.

25 Claims, 3 Drawing Sheets

U.S. PATENT DOCUMENTS

| | | | |
|---|---|---|---|
| 6,527,937 B2 | 3/2003 | Fife | |
| 6,576,099 B2 | 6/2003 | Kimmel et al. | |
| 6,592,740 B2 | 7/2003 | Fife | |
| 6,639,787 B2 | 10/2003 | Kimmel et al. | |
| 6,674,635 B1 | 1/2004 | Fife et al. | |
| 6,870,727 B2 * | 3/2005 | Edson et al. | 361/523 |
| 7,116,548 B2 | 10/2006 | Satterfield, Jr. et al. | |
| 7,220,397 B2 | 5/2007 | Kimmel et al. | |
| 7,341,705 B2 | 3/2008 | Schnitter | |
| 7,381,396 B2 | 6/2008 | Thomas et al. | |
| 7,419,926 B2 | 9/2008 | Schnitter et al. | |
| 7,468,882 B2 | 12/2008 | Marek et al. | |
| 7,515,396 B2 | 4/2009 | Biler | |
| 7,532,457 B2 * | 5/2009 | Dvorak et al. | 361/528 |
| 7,724,502 B2 * | 5/2010 | Petržilek et al. | 361/523 |
| 7,826,200 B2 * | 11/2010 | Pascenko | 361/523 |
| 7,929,274 B2 * | 4/2011 | Reed et al. | 361/528 |
| 7,969,713 B2 | 6/2011 | Matsuoka et al. | |
| 7,990,686 B2 | 8/2011 | Matsuoka et al. | |
| 8,094,434 B2 * | 1/2012 | Rawal et al. | 361/538 |
| 8,125,768 B2 * | 2/2012 | Horacek et al. | 361/532 |
| 2009/0231784 A1 | 9/2009 | Matsuoka et al. | |

FOREIGN PATENT DOCUMENTS

| | | |
|---|---|---|
| GB | 2 445673 A | 7/2008 |
| JP | 8 316104 A | 11/1996 |

* cited by examiner

SOLID ELECTROLYTIC CAPACITOR WITH IMPROVED ANODE TERMINATION

BACKGROUND OF THE INVENTION

Solid electrolytic capacitors (e.g., tantalum capacitors) have been a major contributor to the miniaturization of electronic circuits and have made possible the application of such circuits in extreme environments. Many conventional solid electrolytic capacitors are formed with terminations that can be surface mounted onto a printed circuit board. Anode terminations, for example, are often formed by raising a portion of a metal leadframe upwardly toward the capacitor element. The raised portion of the leadframe may then be welded to a wire extending from the anode. One problem with such conventional terminations, however, is that it is often difficult to form stable connections with relatively thick anode lead wires, which can have an adverse impact on electrical performance. As such, a need currently exists for an improve anode termination for use in solid electrolytic capacitors, and particularly those that employ a relatively thick anode lead wire.

SUMMARY OF THE INVENTION

In accordance with one embodiment of the present invention, a capacitor element is disclosed that that defines an upper surface, lower surface, front surface, and rear surface. The capacitor element includes an anode, dielectric layer overlying the anode, and a cathode overlying the dielectric layer that includes a solid electrolyte, and wherein an anode lead is electrically connected to the anode. A cathode termination is electrically connected to the cathode. The capacitor comprises an anode termination containing a first portion and a second portion, wherein the first portion is substantially parallel to the lower surface of the capacitor element and wherein the second portion is folded to form at least two sections that are substantially perpendicular to the first portion of the anode termination. A slot extends through the sections and receives the anode lead.

In accordance with another embodiment of the present invention, a method for forming a capacitor is disclosed. The method comprises providing a leadframe that contains an anode termination and a cathode termination, wherein the anode termination contains a base and a tab extending therefrom, the tab defining a recess. The tab is folded in an upwardly direction and thereafter, the upwardly positioned tab is folded along an axis in a downwardly direction to form an upstanding portion having at least two sections that are substantially perpendicular to the base. A slot extends through the sections. A capacitor element is positioned onto the leadframe so that the anode lead is received by the slot. The anode lead is electrically connected to the upstanding portion.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a capacitor containing a solid electrolytic capacitor element that includes an anode, dielectric, and solid electrolyte. An anode lead extends from the anode and is electrically connected to an anode termination. The anode termination contains an upstanding portion that is bent or folded about an axis so that it possesses two or more sections. A slot (e.g., U-shaped) extends through the sections of the upstanding portion for receiving an anode lead. The resulting "folded" configuration of the anode termination increases the total thickness of the upstanding portion and its associated slot, which thereby enhances the degree of mechanical support and stability that the termination provides to the anode lead. This is particularly beneficial for thicker anode leads, such as those having a height and/or width of about 100 micrometers or more, in some embodiments about 200 micrometers or more, and in some embodiments, from about 250 to about 1000 micrometers.

Figure 1:
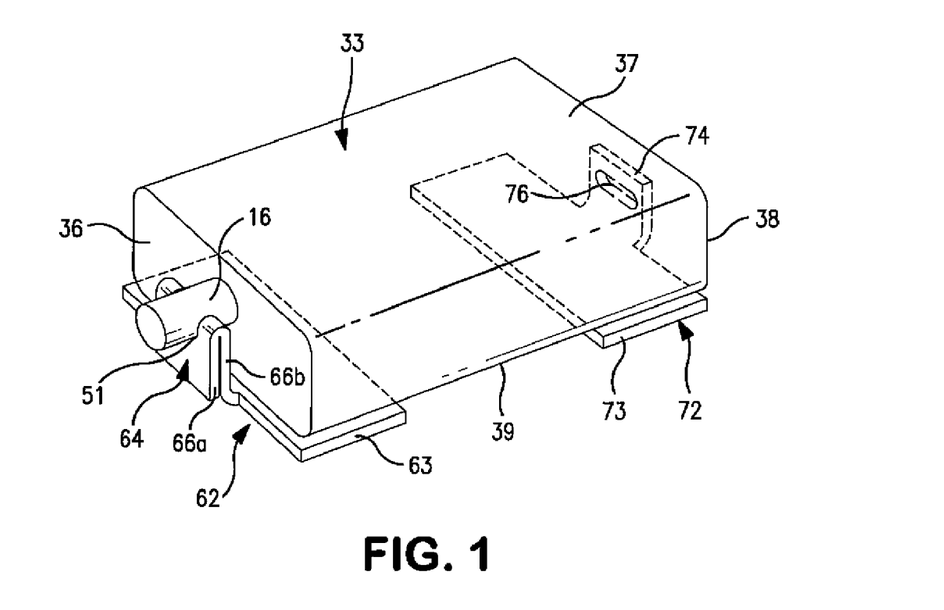
FIG. 1 is a perspective view of one embodiment of a capacitor element connected to anode and cathode terminations.
Figure 5:
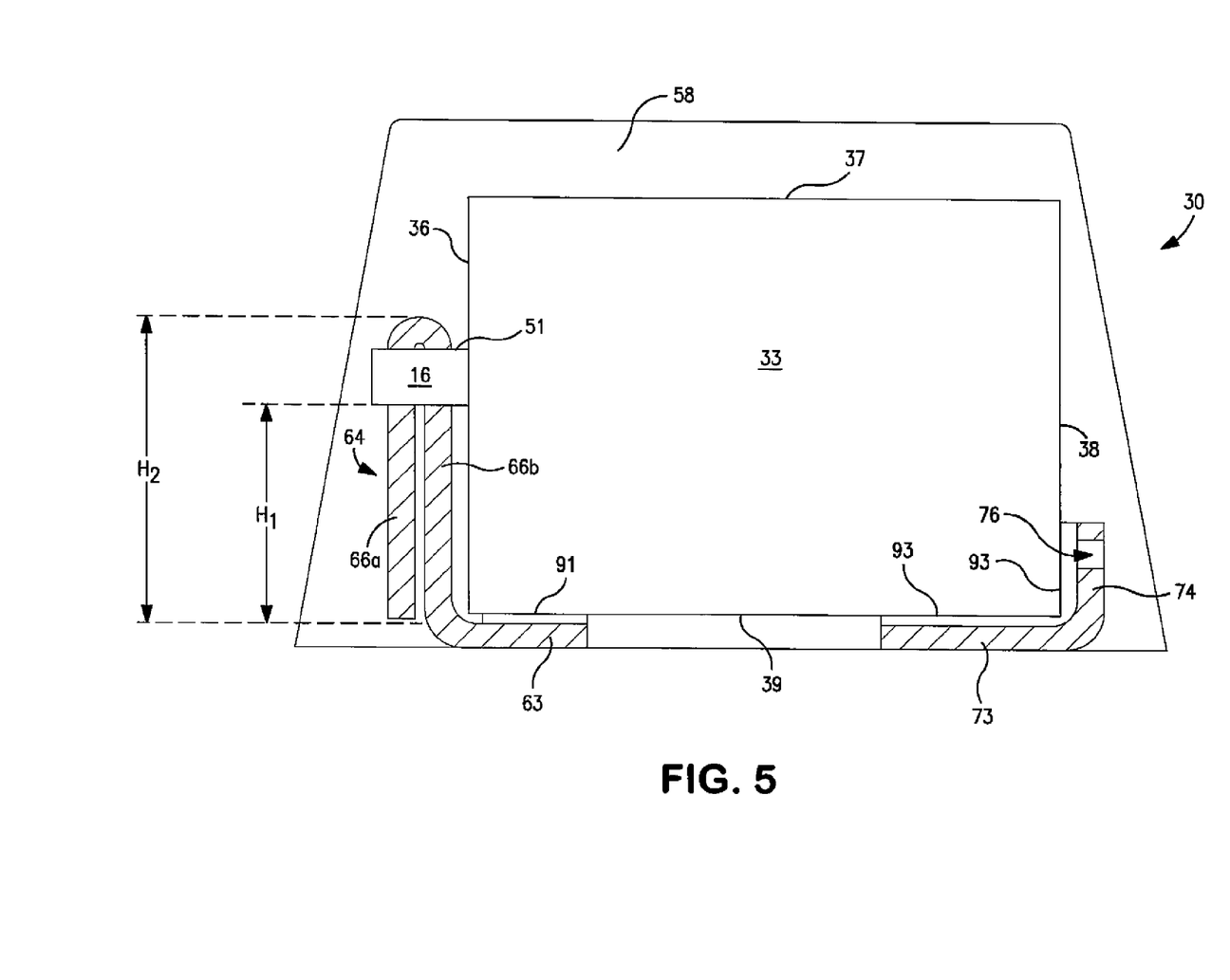
FIG. 5 is a side view of one embodiment of the capacitor of the present invention.

Referring to FIGS. 1 and 5, one embodiment of a capacitor 30 is shown that includes an anode termination 62 and a cathode termination 72 in electrical connection with a capacitor element 33 having an upper surface 37, lower surface 39, front surface 36, and rear surface 38. Although not specifically shown, the capacitor element 33 contains an anode, dielectric, and solid electrolyte. The anode may be formed from a valve metal composition having a high specific charge, such as about 5,000 μF*V/g or more, in some embodiments about 25,000 μF*V/g or more, in some embodiments about 40,000 μF*V/g or more, and in some embodiments, from about 70,000 to about 200,000 μF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No.

6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum or an inert atmosphere. Upon sintering, the pellet shrinks due to the growth of bonds between the particles. In addition to the techniques described above, any other technique for constructing the anode body may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.05 to about 2 millimeters, and in some embodiments, from about 0.1 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No 5,949,639 to Maeda, et al.; and U.S. Pat. No 3,345,545 to Bourqault et al., as well as U.S. Patent Application Publication No. 2005/0270725 to Hahn, et al., all of which are incorporated herein in their entirety by reference thereto for all purposes.

An anode lead 16 (e.g., wire, sheet, etc.) is also electrically connected to the anode. The lead 16 is typically formed from any electrically conductive material, such as tantalum, niobium, nickel, aluminum, hafnium, titanium, etc., as well as oxides and/or nitrides of thereof. The manner in which the lead 16 is connected may vary as is known in the art, such as by coupling the lead using resistance or laser welding, embedding the lead into the anode body during its formation (e.g., prior to sintering), etc. In the illustrated embodiment, for example, the lead 16 is in the form of an embedded wire that extends from the front surface 36 of the capacitor element 33.

Once constructed, the anode may be anodized so that a dielectric layer is formed over and/or within the anode. Anodization is an electrochemical process by which the anode is oxidized to form a material having a relatively high dielectric constant. For example, a niobium oxide (NbO) anode may be anodized to niobium pentoxide ($Nb_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Once the dielectric layer is formed, a protective coating may optionally be applied, such as one made of a relatively insulative resinous material (natural or synthetic). Such materials may have a specific resistivity of greater than about 10 Ω/cm, in some embodiments greater than about 100, in some embodiments greater than about 1,000 Ω/cm, in some embodiments greater than about $1\times10^5$ Ω/cm, and in some embodiments, greater than about $1\times10^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming a cathode that includes a solid electrolyte, such as a manganese dioxide, conductive polymer, etc. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

A conductive polymer coating may also be employed that contains one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. The conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating.

In one particular embodiment, the conductive coating contains a substituted polythiophene, which is π-conjugated and has intrinsic electrical conductivity (e.g., electrical conductivity of at least about 1 μS cm$^{-1}$). The substituted polythiophene may have recurring units of general formula (I), formula (II), or both:

(I)

(II)

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable substituted polythiophenes are those in which "A" is an optionally substituted $C_2$ to $C_3$ alkylene radical and x is 0 or 1. In one particular embodiment, the substituted polythiophene is poly(3,4-ethylenedioxythiophene) ("PEDT"), which has recurring units of formula (II), wherein "A" is $CH_2$—$CH_2$ and "x" is 0. The monomers used to form such polymers may vary as desired. For instance, particularly suitable monomers are substituted 3,4-alkylenedioxythiophenes having the general formula (III), (IV), or both:

wherein, A, R, and X are as defined above.

Examples of such monomers include, for instance, optionally substituted 3,4-ethylenedioxythiophenes. One commercially suitable example of 3,4-ethylenedioxythiophene is available from H.C. Starck GmbH under the designation Clevios™ M. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers, such as described above, may be chemically polymerized in the presence of an oxidative catalyst. The oxidative catalyst typically includes a transition metal cation, such as iron (III), copper(II), chromium(VI), cerium(IV), manganese(IV), manganese(VII), ruthenium (III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron (III) cations, such as iron (III) halides (e.g., $FeCl_3$) or iron (III) salts of other inorganic acids, such as $Fe(ClO_4)_3$ or $Fe_2(SO_4)_3$ and the iron (III) salts of organic acids and inorganic acids comprising organic radicals. Examples of iron (III) salts of inorganic acids with organic radicals include, for instance, iron (III) salts of sulfuric acid monoesters of $C_1$ to $C_{20}$ alkanols (e.g., iron (III) salt of lauryl sulfate). Likewise, examples of iron (III) salts of organic acids include, for instance, iron (III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron (III) salts may also be used. Iron (III)-p-toluene sulfonate, iron (III)-o-toluene sulfonate, and mixtures thereof, are particularly suitable. One commercially suitable example of iron (III)-p-toluene sulfonate is available from H.C. Starck GmbH under the designation Clevios™ C.

Various methods may be utilized to form the conductive coating. In one embodiment, the oxidative catalyst and monomer are applied, either sequentially or together, such that the polymerization reaction occurs in situ on the part. Suitable application techniques may include screen-printing, dipping, electrophoretic coating, and spraying, may be used to form a conductive polymer coating. As an example, monomer may initially be mixed with the oxidative catalyst to form a precursor solution. Once the mixture is formed, it may be applied and allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The part may then be dried to remove the solvent therefrom. Thereafter, the part may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812, 367 to Kudoh, et al., which are incorporated herein in their entirety by reference thereto for all purposes.

In addition to or in conjunction with coating that are formed by in situ application, a conductive coating may also be employed that is in the form of a dispersion of conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene corresponds referred to the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("µm") to about 50 µm, in some embodiments from about 0.5 µm to about 20 µm, and in some embodiments, from about 1 µm to about 5 µm. It should be understood that the thickness of the coating is not necessarily the same at all locations on the part. Nevertheless, the average thickness of the coating generally falls within the ranges noted above.

The conductive polymer coating may optionally be healed. Healing may occur after each application of a conductive polymer layer or may occur after the application of the entire conductive polymer coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

If desired, the part may optionally be applied with an external coating. The external coating may contain at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 μm to about 50 μm, in some embodiments from about 2 μm to about 30 μm, and in some embodiments, from about 5 μm to about 10 μm. Likewise, the thickness of the metal layer is typically within the range of from about 1 μm to about 100 μm, in some embodiments from about 5 μm to about 50 μm, and in some embodiments, from about 10 μm to about 25 μm.

Regardless of the manner in which it is formed, the resulting capacitor element 33 is provided in electrical contact with the anode termination 62 and cathode termination 72, as mentioned above. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

Although it may be in electrical contact with any of the surfaces of the capacitor element 33, the cathode termination 72 in the illustrated embodiment is in electrical contact with the lower surface 39 and rear surface 38. More specifically, the cathode termination 72 contains a first portion 73 that is relatively flat and positioned substantially parallel to the lower surface 39 of the capacitor element 33, and a second, upstanding portion 74 that is positioned substantially perpendicular (e.g., 90°±5°) to the flat portion 73. The upstanding portion 74 is in electrical contact and substantially parallel to the rear surface 38 of the capacitor element 33. Optionally, the upstanding portion 74 may define an aperture 76 that facilitates its ability to be folded during manufacture of the capacitor. Although depicted as being integral, it should also be understood that the flat and upstanding portions may alternatively be separate pieces that are connected together, either directly or via an additional conductive element (e.g., metal).

The anode termination 62 also contains a first portion 63 that is relatively flat and positioned substantially parallel to the lower surface 39 of the capacitor element 33, and a second, upstanding portion 64 that is positioned substantially perpendicular (e.g., 90°±5°) to the flat portion 63. The upstanding portion 64 is bent along an axis "A" so a first section 66a and a second section 66b together form a reversed "U-shaped" configuration. The sections 66a and 66b are each typically positioned substantially perpendicular (e.g., 90°±5°) to the flat portion 63 of the anode termination 62. As better shown in FIG. 1, a slot 51 extends through both sections of the upstanding portion 64 for receiving the anode lead 16. The slot 51 may have any of a variety of different shapes and/or sizes. In the illustrated embodiment, for example, the slot 51 has a "U-shape" for further enhancing surface contact and mechanical stability of the lead 16.

Figure 2:
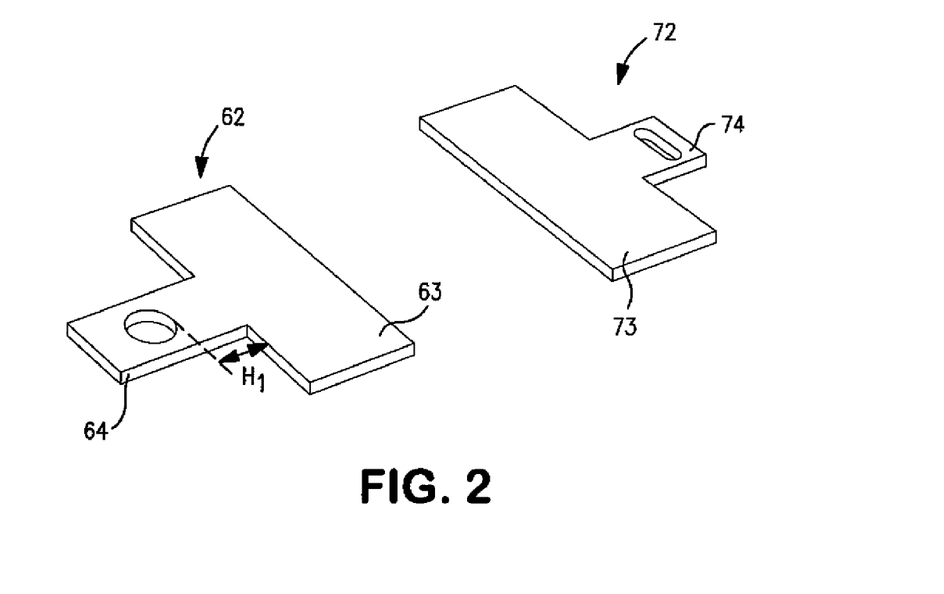
FIG. 2 is a perspective view of one embodiment of a leadframe for use in the present invention.
Figure 3:
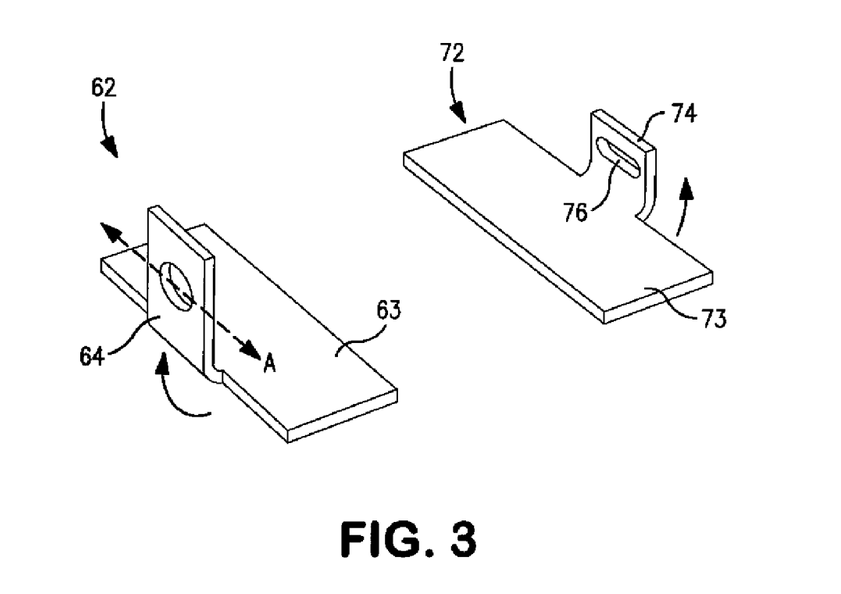
FIG. 3 is a perspective view of the leadframe of FIG. 2, in which portions of the anode and cathode terminations are bent upwardly.
Figure 4:
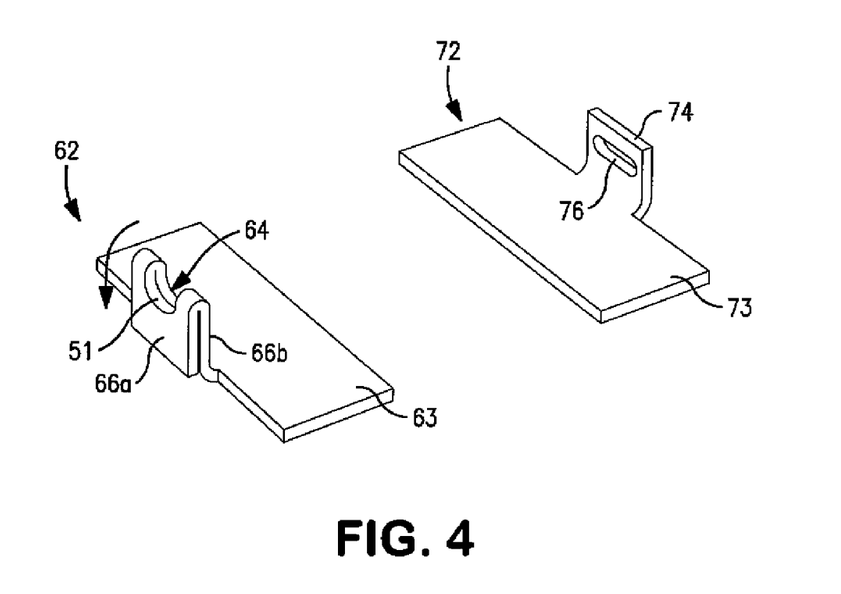
FIG. 4 is a perspective view of the leadframe of FIG. 3, in which another portion of the anode termination is bent downwardly.

An exemplary manner in which a capacitor element is attached to a leadframe containing anode and cathode terminations 62 and 72 is shown in FIGS. 2-4 and will now be described in more detail. For sake of simplicity, the formation of only a single capacitor will be described. It should be understood, however, that the leadframe may contain multiple terminations that are cut into individual capacitor assemblies. Referring to FIG. 2, a portion of a leadframe is shown that contains anode and cathode terminations 62 and 72, such as described above. It should be understood that only a portion of the leadframe is shown, and that it will generally contain other components not expressly shown. For example, the terminations may be initially connected via a metal sheet that is subsequently removed during manufacture of the capacitor.

The leadframe of FIG. 2 is shown in an initial "flat" configuration. In this embodiment, the anode termination 62 has a base 63 and a tab 64 extending therefrom. As shown in FIG. 3, the tab 64 is bent upwardly to form the upstanding portion. The upstanding tab portion 64 is then bent downwardly along a fold axis "A" so that a recess or hole 78 in the portion 64 forms the desired slot 51. The shape and size of the recess 78, the height of the upstanding portion 64, and the location of the fold axis "A" (FIG. 3) together dictate the resulting the height of the slot 51. For example, the recess 78 may have a circular shape and a diameter of from about 20 to about 1000 micrometers, in some embodiments from about 100 to about 600 micrometers, and in some embodiments, from about 200 to about 500 micrometers. The upstanding portion 64 may likewise have a height "$H_1$" (see e.g., FIG. 2 and FIG. 5, measured from the upper surface of the flat portion 63 to the upper end of the portion 64) of from about 400 to about 5000 micrometers, in some embodiments from about 600 to about 1500 micrometers, and in some embodiments, from about 800 to about 1200 micrometers. The location of the fold axis "A" may vary as desired, but often extends through the center of the recess 78 as shown in FIG. 3. The height "$H_2$" of the resulting slot 51 (see e.g., FIG. 2 and FIG. 5, measured from the upper surface of the flat portion 63 to the lower surface of the portion of the slot 51 on which the anode lead 16 rests) may likewise be from about 250 to about 3000 micrometers, in some embodiments from about 400 to about 1500 micrometers, and in some embodiments, from about 500 to about 1000 micrometers.

The cathode termination 72 also initially contains a base 73 and a tab 74 extending therefrom. Again, as shown in FIG. 3, the tab 74 may be bent upwardly to form the upstanding portion. If desired, the tab 74 may alternatively remain flat until the capacitor element 33 is encased.

Referring again to FIGS. 1 and 5, once the termination(s) are bent into the desired configuration, the capacitor element 33 is positioned thereon so that its lower surface 39 contacts the flat portions 63 and 73, and so that the anode lead 16 is received by the slot 51. If desired, a conductive adhesive 93 may be positioned between the cathode termination 72 and the capacitor element 33 to improve the degree of attachment. Likewise, an insulating material 91, such as a plastic pad or tape, may also be positioned between the lower surface 39 of the capacitor element 33 and the flat portion 63 of the anode termination 62 to electrically isolate the anode and cathode terminations. The anode lead 16 may then be electrically connected to the slot 51 using any technique known in the art, such as mechanical welding, laser welding, conductive adhesives, etc. Upon electrically connecting the anode lead 16, the optional conductive adhesive may be cured. For example, a heat press may be used to apply heat and pressure to ensure that the capacitor element 33 is adequately adhered to the cathode termination 72 by the adhesive.

Once the capacitor element is attached, the lead frame is enclosed within a resin casing 58 (FIG. 5), which be filled with silica or any other known encapsulating material. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). Regardless of the case size employed, the capacitor element 33 is encapsulated so that at least a portion of the anode and cathode terminations 62 and 72 are exposed for mounting onto a circuit board. In the embodiment illustrated in FIG. 5, for example, the flat portion 63 of the anode termination 62 is exposed, but the upstanding portion 64 is encapsulated within the casing 58. Likewise, the flat portion 73 of the cathode termination 72 is also exposed, but the upstanding portion 74 is encapsulated within the casing 58.

The present invention may be better understood by the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current:

Leakage current ("DCL") was measured using a leakage test set that measures leakage current at a temperature of 25° C. and at the rated voltage after a minimum of 60 seconds.

EXAMPLE 1

To form the capacitor, a tantalum anode containing a tantalum wire (diameter of 0.5 mm) was initially anodized at 15.5V in a liquid electrolyte to 150 μF. A conductive polymer coating was then formed by dipping the anode into a butanol solution of iron (III) toluenesulfonate (CLEVIOS™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 6 times. Thereafter, the part was dipped into a dispersed poly(3,4-ethylenedioxythiophene) having a solids content 2% and dried at 125° C. for 20 minutes. Once again, this process was repeated 6 times. The parts were then coated by graphite and silver as is known in the art.

Once formed, the tantalum wire of the capacitor element was cut by laser to a specific length. A fiber laser with a small spot diameter was used to prevent any mechanical and temperature damage to the conductive polymer. Thereafter, the capacitor element was placed in a pocket of a leadframe so that the tantalum wire was accommodated by a U-shaped slot of a "folded" upstanding portion of the leadframe, such as shown in FIGS. 1-5. Once positioned in this manner, the wire was welded to the upstanding portion using a pulsed laser beam. After attaching the capacitor element to the leadframe, it was encapsulated within a "B" case having a height of about 1.90 mm, a width of about 2.80 mm and a length of about 3.50 mm. 1,100 parts were made by the method described above.

EXAMPLE 2

Capacitors were formed the manner described in Example 1, except that the upstanding portion of the leadframe was not folded as shown in FIGS. 1-3. 1,100 parts were made by this method.

Once formed, the parts of Examples 1 and 2 were subjected to various performance tests. 95% of the parts of Example 1 were determined to pass the performance testing, while only 10% of those in Example 2 passed. It is believed that the low yield was due to melting and evaporation of the tantalum wire by the high energy of the laser beam. Leakage current, ESR, capacitance, and dissipation factor were also tested. The median test results are set forth below:

| | Median Test Results | | | |
|---|---|---|---|---|
| Example | DCL [μA] | ESR [mOhm] | Cap [μF] | Df [—] |
| 1 | 2.3 | 43 | 138.9 | 0.24 |
| 2 | 8.7 | 58 | 139.2 | 0.25 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor comprising:
   a capacitor element that defines an upper surface, lower surface, front surface, and rear surface, wherein the capacitor element includes an anode, dielectric layer overlying the anode, and a cathode overlying the dielectric layer that includes a solid electrolyte, and wherein an anode lead is electrically connected to the anode;
   a cathode termination that is electrically connected to the cathode; and
   an anode termination containing a first portion and a second portion, wherein the first portion is substantially parallel to the lower surface of the capacitor element, and wherein the second portion is folded to form at least two sections that are substantially perpendicular to the first portion of the anode termination, wherein a slot extends through the sections and receives the anode lead.

2. The capacitor of claim 1, wherein the slot has a U-shape.

3. The capacitor of claim 1, wherein the second portion has a height of from about 400 to about 5000 micrometers.

4. The capacitor of claim 1, wherein the second portion has a height of from about 800 to about 1200 micrometers.

5. The capacitor of claim 1, wherein the slot has a height of from about 250 to about 3000 micrometers.

6. The capacitor of claim 1, wherein the slot has a height of from about 500 to about 1000 micrometers.

7. The capacitor of claim 1, further comprising a case that encapsulates the capacitor element and leaves exposed at least a portion of the anode termination and cathode termination.

8. The capacitor of claim 7, wherein the second portion of the anode termination is encapsulated within the case.

9. The capacitor of claim 1, further comprising an insulating material that is positioned between the first portion of the anode termination and the lower surface of the capacitor element.

10. The capacitor of claim 1, wherein the cathode termination contains a first portion that is electrically connected to a lower surface of the capacitor element and a second portion that is electrically connected to the rear surface of the capacitor element.

11. The capacitor of claim 1, wherein the anode includes tantalum, niobium, or an electrically conductive oxide thereof.

12. The capacitor of claim 1, wherein the solid electrolyte includes a conductive polymer.

13. The capacitor of claim 12, wherein the conductive polymer is poly(3,4-ethylenedioxythiophene).

14. The capacitor of claim 12, further comprising a conductive coating that overlies the solid electrolyte, wherein the conductive coating contains a dispersion of conductive polymer particles.

15. The capacitor of claim 1, wherein the anode lead has a height and/or width of about 100 micrometers or more.

16. The capacitor of claim 1, wherein the anode lead has a height and/or width of from about 250 to about 1000 micrometers.

17. A method for forming a capacitor, the method comprising:
providing a leadframe that contains an anode termination and a cathode termination, wherein the anode termination contains a base and a tab extending therefrom, the tab defining a recess;
folding the tab in an upwardly direction;
thereafter folding the tab along an axis in a downwardly direction to form an upstanding portion having at least two sections that are substantially perpendicular to the base, wherein a slot extends through the sections;
positioning a capacitor element onto the leadframe so that the anode lead is received by the slot; and
electrically connecting the anode lead to the upstanding portion.

18. The method of claim 17, further comprising electrically connecting the cathode termination to the cathode.

19. The method of claim 17, wherein the recess has a generally circular shape.

20. The method of claim 17, wherein the recess has a diameter of from about 20 to about 1000 micrometers.

21. The method of claim 17, wherein the recess has a diameter of from about 200 to about 500 micrometers.

22. The method of claim 17, wherein the axis extends through the center of the recess.

23. The method of claim 17, further comprising encapsulating the capacitor element in a case so that at least a portion of the anode termination and cathode termination remain exposed.

24. The method of claim 17, wherein the capacitor element includes an anode, dielectric layer overlying the anode, and a cathode overlying the dielectric layer that includes a solid electrolyte.

25. The method of claim 24, wherein the solid electrolyte includes a conductive polymer.

* * * * *